Feb. 7, 1933.  T. H. STRACHAN  1,896,258
COUNTER SCALE
Filed Nov. 12, 1930  4 Sheets-Sheet 1
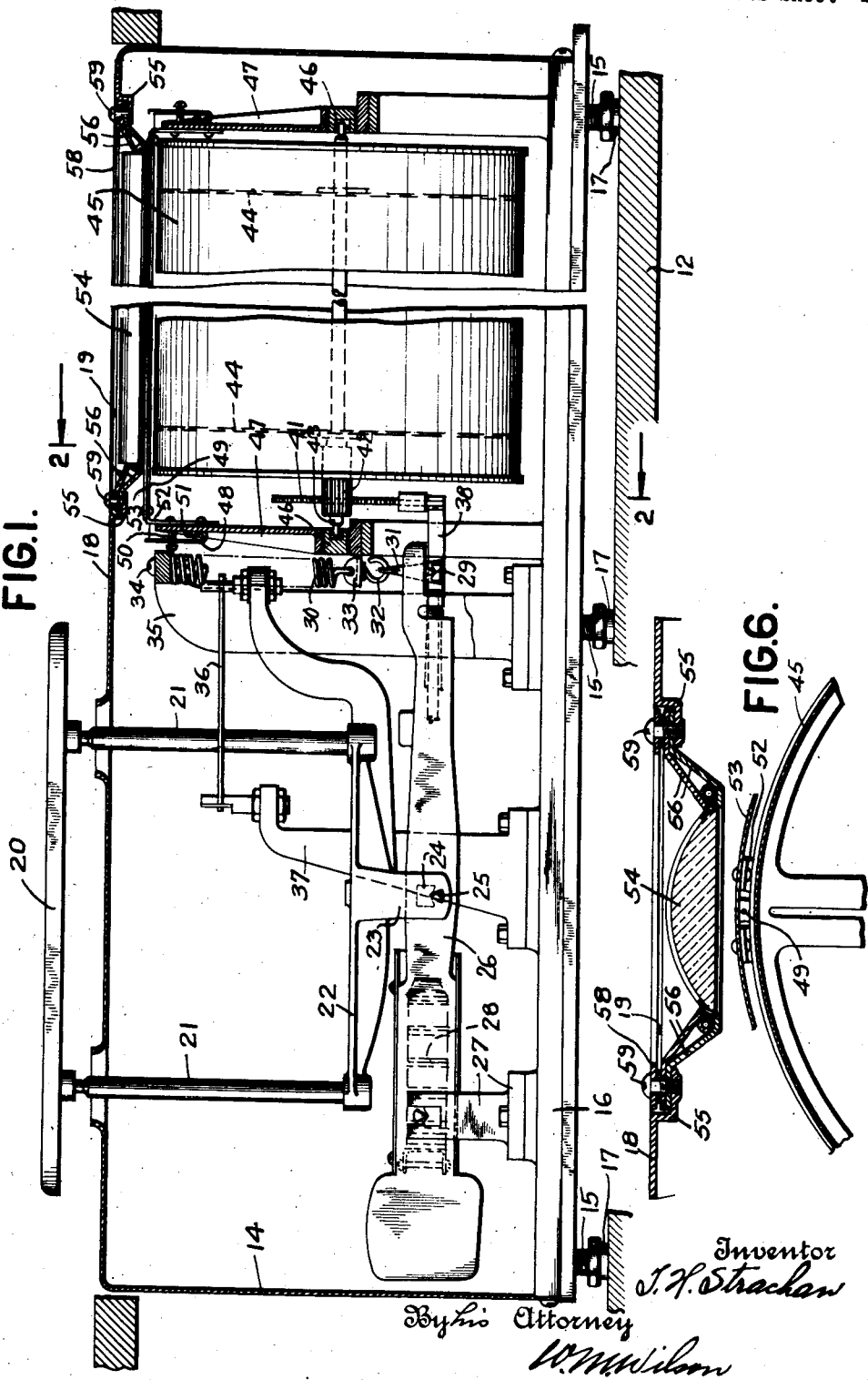

Feb. 7, 1933.                T. H. STRACHAN                1,896,258
                               COUNTER SCALE
                           Filed Nov. 12, 1930          4 Sheets-Sheet 2
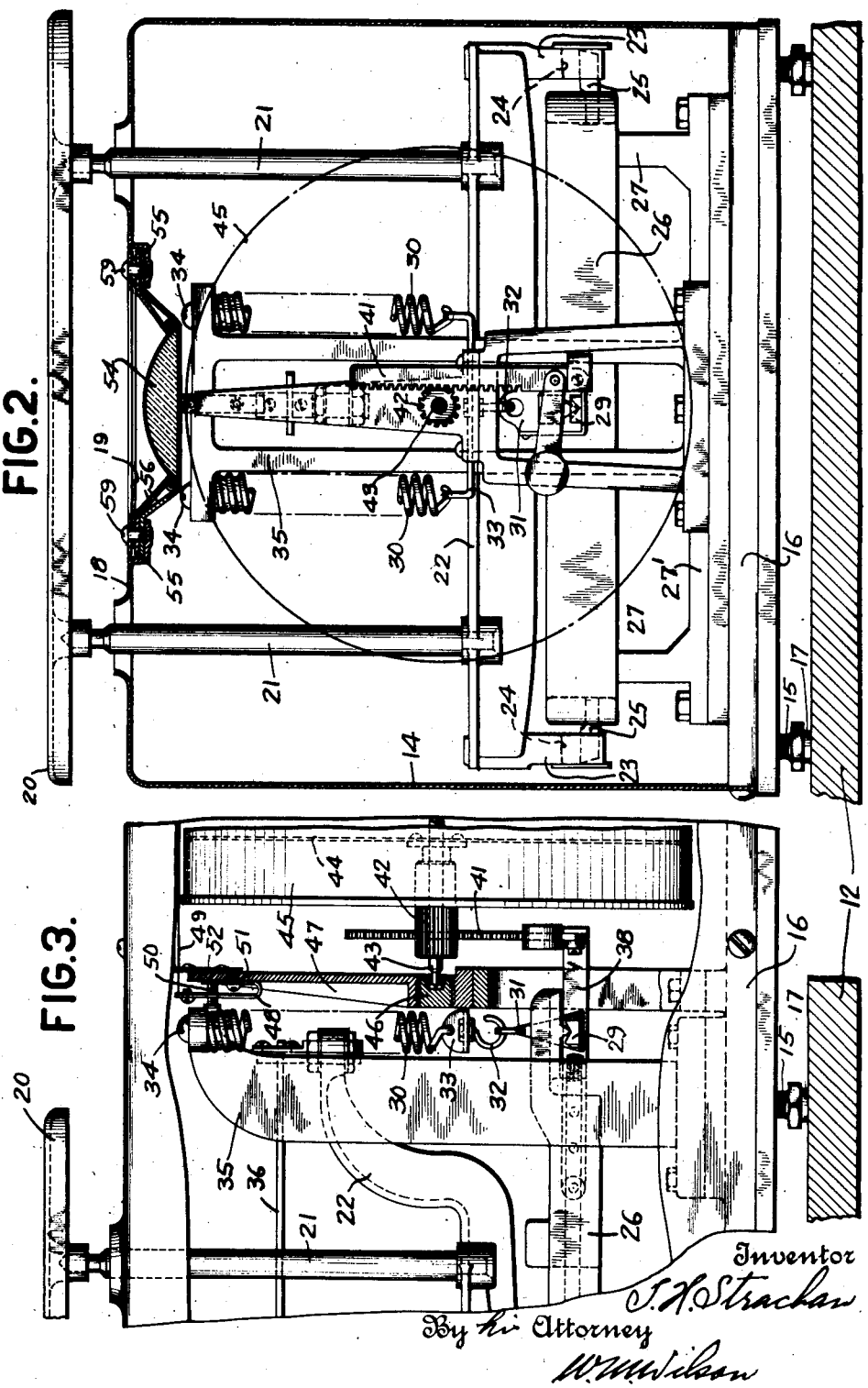

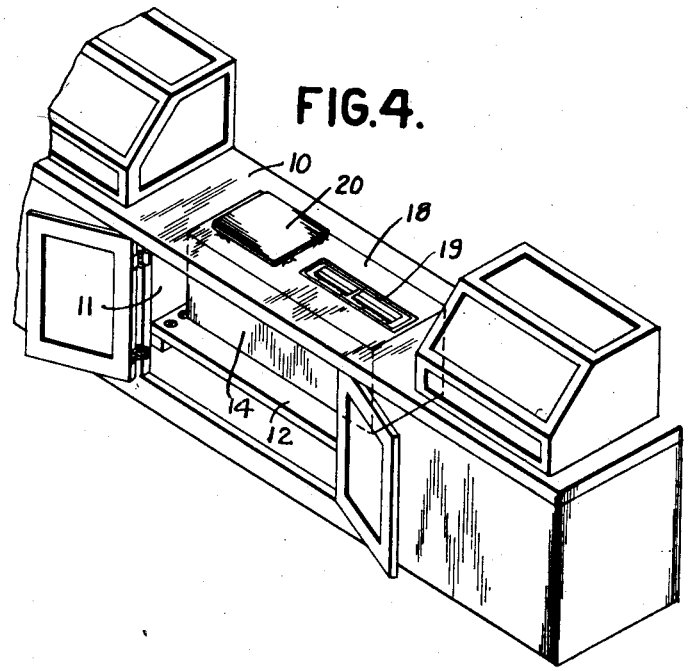
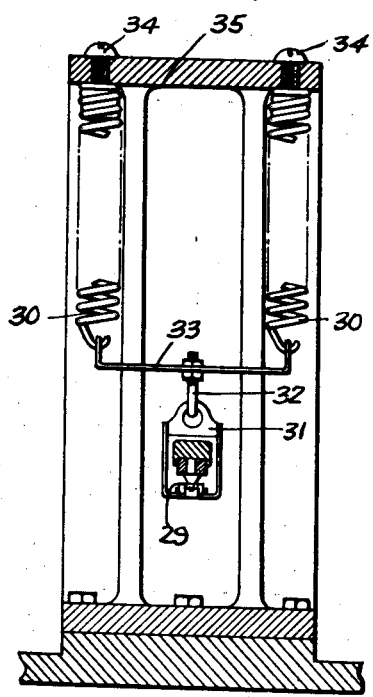
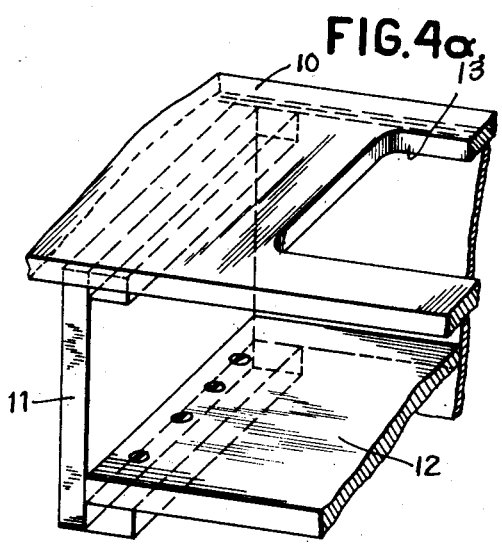

Feb. 7, 1933.　　　　T. H. STRACHAN　　　　1,896,258
COUNTER SCALE
Filed Nov. 12, 1930　　　　4 Sheets-Sheet 4
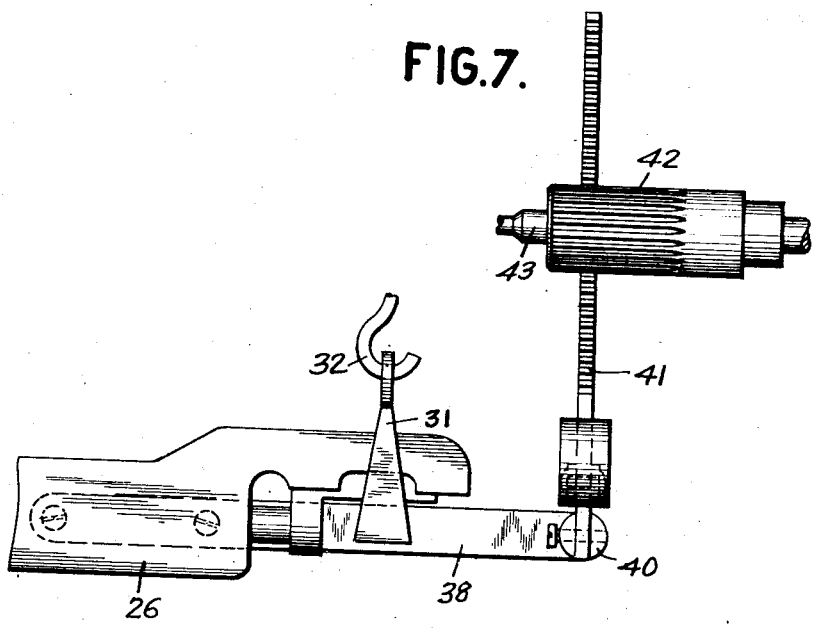
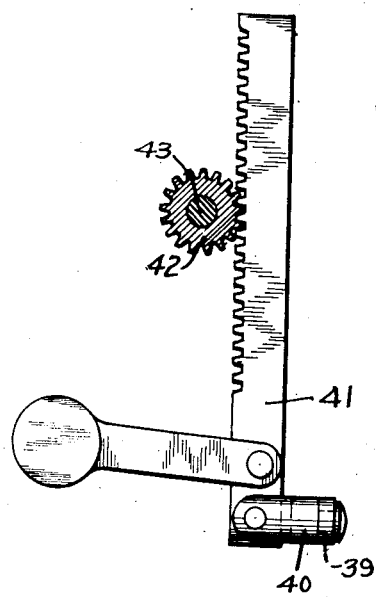
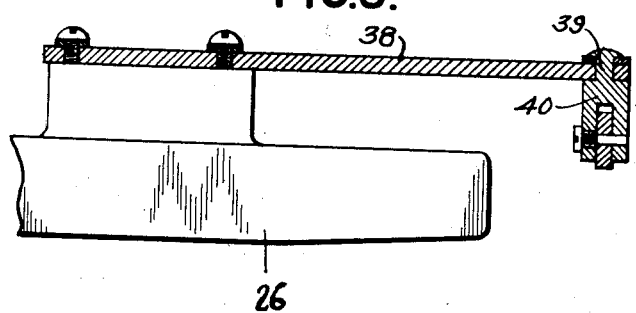
INVENTOR
T. H. Strachan
BY his ATTORNEY Patented Feb. 7, 1933

1,896,258

UNITED STATES PATENT OFFICE

THOMAS H. STRACHAN, OF DAYTON, OHIO, ASSIGNOR TO DAYTON SCALE COMPANY, OF DAYTON, OHIO, A CORPORATION OF NEW JERSEY

COUNTER SCALE

Application filed November 12, 1930. Serial No. 495,073.

This case relates to weighing scales, particularly for use on the counters of retail stores.

The object of the invention is to provide a scale which may be set flush with the top of the counter, and have substantially no portions projecting above the counter to interfere with the movement of articles or to obstruct the view of the merchant or customer.

More specifically the object of the invention is to provide a novel scale of the spring counterbalancing type provided with a drum indicator having a reading line clearly visible from both sides of the counter.

Another object is to provide aforesaid scale in combination with a novel counter for supporting the scale.

Various other objects and advantages of my invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 1 is a vertical section through the machine.

Fig. 2 is a section taken along the line 2—2 of Fig. 1.

Fig. 3 is a detail view of the drum chart actuating means.

Fig. 4 is a perspective view of the scale assembled with a counter.

Fig. 4a is a detail of the shelf arrangement.

Fig. 5 is a detail of the counterbalancing spring arrangement.

Fig. 6 is a detail of the indicator portion of the scale, and

Figs. 7, 8, and 9 are details of the indicator driving portion of the scale.

Referring to the drawings in detail, the counter 10 is provided with vertical depending standards 11 for supporting between them a horizontal shelf 12. The counter top has a hole 13 of substantially the same shape as the cross section of the scale housing 14. The scale rests on the shelf 12 and is adjustable for leveling purposes by means of screws 15 threaded into the base plate 16 and having cup shaped depressions in the lower end in which are seated studs 17 fixed to the shelf 12. When in position on the counter the upper face 18 of the scale housing is flush with the top of the counter, the indicating window 19 being slightly below face 18. The only part of the scale projecting above the counter top is the platform 20 which occupies a relatively small space. The platform rests at each corner on posts 21 from which is supported a frame 22. Extending transversely from opposite sides of frame 22 are depending lugs 23 carrying inverted V-grooved bearings 24 resting on knife edges 25 of the base lever 26. The latter is fulcrumed on legs 27 upstanding from each end of a horizontal plate 27' which is bolted to the base plate 16 of the scale. The lever 26 is provided with the usual thermostat 28 for adjusting the position of nose iron 29 relative to lever 26 in accordance with changes in temperature to compensate for the effect of the temperature on the length of counterbalancing springs 30. The nose iron is cradled in a stirrup 31 which is suspended from the hook 32 centrally attached to the draw bar 33 to opposite sides of which are hooked counterbalancing springs 30. The latter are supported at their upper ends by bolts 34 carried by the upper end of a standard 35 secured to the base of the scale. A check rod 36 is connected at one end to the frame 22 and at its other end to a standard 37 bolted to the base of the scale.

An extension 38 of the base lever is swiveled at its outer end on a pin 39 of a link 40 to which the rack 41 is pivoted on an axis transverse to the pin 39. The rack is in mesh with pinion 42 of the shaft 43 to which is secured the spiders 44 carrying the cylindrical chart 45. The shaft is journaled at both ends in ball bearing races 46 secured in frames 47 bolted to the base of the scale. The upper ends of the frames 47 have secured thereto U-shaped members 48 carrying between them the indicator wire 49. An adjustment for keeping the indicator wire taut is provided by screws 50 for spreading the legs of the U-shaped members 48. The latter is secured to the frames 47 by screws 51 which permit a slight rotational adjustment to adjust the indicator wire parallel to the chart axis. Also secured to the frames 47 are right angular bent plates 52 carrying between them the price face plate 53. Above the latter and the indicator wire 49, the housing top 18 is cut out to form an inset opening for accommodating a reading lens 54. The sides of the opening are bounded by inwardly offset flanges 55 formed by bending the edges of the housing top 18 inwardly. The lens 54 is held between plates 56 which rest on flanges 55. The glass window 19 is held between the upper plate 56 and a plate 58. The entire assembly is secured to flanges 55 by screws 59. By means of the inward recessing of the scale housing, it is possible to locate the chart reading assembly substantially flush with the upper face of the housing.

In operation a load placed on the platform rocks the base lever clockwise against the resistance of the counterbalancing springs simultaneously moving the rack downwardly to rotate the pinion of the drum and position the latter in accordance with the weight on the platform. The merchant on his side of the counter can read the indications very clearly. At the same time the customer can see the chart and the indicator wire so that the reading is visible to him as well as to the merchant, thereby obviating any possibility of the merchant reading the wrong column of the chart without the knowledge of the customer. In order to provide access to the scale, doors 62 are provided on the merchant's side of the counter.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims:

I claim:

1. In combination, a counter, a scale carried by the counter and provided with a housing having its upper surface forming a continuation of the plane of the top of the counter, a chart within the housing, weighing means for operating the chart, and a reading assembly for the chart in substantially the plane of the counter top.

2. In a scale, in combination, a counter, a shelf secured to the counter below its top, a hole formed in the counter above said support, a scale having a housing of the same cross section as the hole in the counter and having the upper face thereof when carried by said shelf forming a continuation of the top of the counter, a chart and weighing means for operating the chart enclosed in the housing and a reading assembly substantially flush with the top of the counter.

3. In a scale, a counter having rigidly depending therefrom supports, a shelf carried by said supports, a scale resting on said shelf and having a housing with an upper face substantially a continuation of the top of the counter, all portions of the scale housing being below or in the plane of the top of the counter, and means in the counter providing access to the scale below the counter top.

4. In a scale, a load support, a lever connected thereto, counterbalancing springs connected to the lever, an extension provided on said lever, a chart below the plane of the load support rotatable on an axis extending substantially in the same direction as the lever, and driving means for the chart connected to the lever extension.

5. In a scale, a housing having an inset recess, a reading assembly carried in said recess and attached to the bounding edges of the recess, the upper surface of the assembly being substantially flush with the upper face of the housing, a chart below said reading device, and load actuated mechanism for operating said chart.

6. In a scale, a counter, a support secured to the counter below the top thereof, a scale provided with a housing and a base plate carried by the housing, adjustable leveling means for the housing comprising elements secured to the base plate and elements secured to said counter support, one of said latter two elements having a recess in which the other element is seated.

7. In a scale, a platform, a lever operated by the platform, a fulcrum standard for the lever, a check rod for the platform, a frame standard for securing one end of the check rod, a counterbalancing device operated by the lever, a standard for supporting the counter-balancing device, a chart operated by the lever in accordance with the action of the counterbalancing device, a standard for supporting the chart, all of said standards being arranged in parallel planes and secured to a common base plate, and a housing for aforesaid parts.

8. In a scale, a platform, a lever below the platform and operated thereby, a pair of counterbalancing springs spaced transversely of the lever and actuated by the lever, a chart operated by the lever in accordance with the resistance of said counterbalancing springs, a reading assembly for the chart, and a housing having its upper face provided with an inset recess to accommodate the reading device, said lever, springs, chart, reading assembly, and housing being below the plane of the platform.

9. In a scale, a platform, a platform carrier, a base lever below the platform and operatively connected to the platform carrier, a check link connected to the platform carrier to rock parallel to the base lever for maintaining the platform upright throughout a weighing operation, counterbalancing devices spaced transversely of the base lever, and operatively connected to the latter, a cylinder chart controlled by the counterbalancing devices and disposed below the plane of the platform, and a housing for enclosing the chart, lever, and counterbalancing devices, the housing being substantially below the plane of the platform.

10. In a scale, a platform, a rockingly mounted base lever operatively connected to the platform, an equalizer device connected to the nose end of the base lever and disposed closely adjacent said nose end to extend transversely to the longitudinal axis of the lever, counterbalances symmetrically disposed about the longitudinal axis of the lever and connected to the equalizer, a support below the plane of said platform for suspending said counterbalances, and a rotatably mounted computing cylinder chart controlled by said devices and disposed with its axis of rotation below the connection of the counterbalances to said support.

11. In a scale, a platform, a base lever operated by the platform, an equalizer connected to and lying closely adjacent the nose end of the lever and extending transversely of the longitudinal axis of the lever, a pair of counterbalance springs, disposed below the plane of the platform, each spring being connected to the equalizer adjacent one end thereof, and a registering device controlled for movement by the lever.

12. In a scale, a platform, a base lever operated thereby and provided with a nose element, an equalizer lying closely adjacent said nose element, a connection between the equalizer and the nose element of the lever whereby movement of the latter is transferred to the equalizer, counterbalancing means connected to the equalizer adjacent either end thereof, and a computing chart below the plane of the platform operated according to operation of the base lever.

13. In a scale, a platform, a rockingly mounted base lever operated thereby, a spring counterbalance, means above the lever and below the platform for suspending the spring counterbalance, an operating connection between the lever and the spring counterbalance, and a computing drum chart below the plane of the platform operated in accordance with operation of said lever.

14. In a scale, a load bearing platform, a rockingly mounted main base lever operatively connected to the platform, counterbalancing means for resisting the movement of the platform under a load, a rotary computing drum chart below the plane of the platform and disposed with its longitudinal axis horizontal and in the same general direction as the longitudinal axis of the main base lever, an operating connection between the lever and chart, an elongated common housing for enclosing the base lever, counterbalancing means, chart, and the operating connection between the chart and lever, and a sight window for the chart formed in said housing to extend longitudinally of the housing.

15. In a scale, a load bearing platform, a rockingly mounted base lever operatively connected to said platform, counterbalance means, a connection between the counterbalance means and the lever, a computing drum chart controlled for movement according to operation of the counterbalance means and arranged to rotate on axis disposed generally in the same direction as the longitudinal axis of the base lever, a base frame, and a housing rising from and carried by the base frame for enclosing the chart, lever, and counterbalance means, the housing and all the parts therein being below the plane of the platform.

In testimony whereof I hereto affix my signature.

THOMAS H. STRACHAN.